United States Patent
Duff et al.

(10) Patent No.: US 12,222,040 B2
(45) Date of Patent: Feb. 11, 2025

(54) SLIDING SPOOL VALVES, AND METHODS THEREFOR

(71) Applicant: Globalforce IP Limited, Ponsonby (NZ)

(72) Inventors: William Michael Duff, Lynmouth (NZ); Ian Craig Paterson, Milford (NZ)

(73) Assignee: Globalforce IP Limited, Ponsonby (NZ)

( * ) Notice: Subject to any disclaimer, the term of this patent is extended or adjusted under 35 U.S.C. 154(b) by 64 days.

(21) Appl. No.: 17/773,311

(22) PCT Filed: Oct. 30, 2019

(86) PCT No.: PCT/NZ2019/050145
§ 371 (c)(1),
(2) Date: Apr. 29, 2022

(87) PCT Pub. No.: WO2021/086201
PCT Pub. Date: May 6, 2021

(65) Prior Publication Data
US 2022/0390024 A1     Dec. 8, 2022

(51) Int. Cl.
*F16K 11/07*     (2006.01)
*F16K 3/24*      (2006.01)
*F16K 27/04*     (2006.01)

(52) U.S. Cl.
CPC .......... *F16K 11/0712* (2013.01); *F16K 3/243* (2013.01); *F16K 27/041* (2013.01)

(58) Field of Classification Search
CPC ..... F16K 11/0712; F16K 27/041; F16K 3/243
See application file for complete search history.

(56) References Cited

U.S. PATENT DOCUMENTS 2,661,182 A    12/1953  Kipp
2,822,824 A     2/1958  Glower et al.
(Continued)

FOREIGN PATENT DOCUMENTS

GB         662448 A      12/1951
JP         50-150027     12/1975
(Continued)

OTHER PUBLICATIONS

International Search Report issued in International Application No. PCT/NZ2019/050145 by International Bureau on Jan. 24, 2020.
(Continued)

*Primary Examiner* — Kelsey E Cary
(74) *Attorney, Agent, or Firm* — Lowe Graham Jones PLLC; Ellen M. Bierman

(57) ABSTRACT

Disclosed is a spool valve to valve a fluid between at least one inlet port and at least one outlet port, having a bore with a spool operably associated therein. The bore has one or more inlet ports and at least one outlet port. Located in the bore is at least one in-bore seal, the seal fluidly sealing on a seal outer diameter to an inside diameter of the bore, and selectively fluidly sealing on a seal inside diameter to a spool outside diameter. Present also is at least one spacer located in the bore, adjacent the at least one in-bore seal having a fluid communication from a spacer internal diameter to a spacer external diameter with at least one inlet port, or the at least one outlet port. The spool moves to allow or prevent flow from an inlet port to outlet port.

23 Claims, 12 Drawing Sheets

(56) References Cited

U.S. PATENT DOCUMENTS

| | | | | |
|---|---|---|---|---|
| 2,938,704 A | * | 5/1960 | Quail | F16K 11/0712 |
| | | | | 251/363 |
| 3,303,855 A | * | 2/1967 | Kurtz | F15B 13/0402 |
| | | | | 137/625.66 |
| 6,991,236 B1 | * | 1/2006 | Andrews | F15B 13/0402 |
| | | | | 277/587 |

FOREIGN PATENT DOCUMENTS

| | | |
|---|---|---|
| JP | S53-134234 A | 11/1978 |
| JP | H01-224579 A | 9/1989 |

OTHER PUBLICATIONS

Notice of Reasons for Rejection issued in Japanese Patent Application No. JP2022-525676 by Japanese Patent Office on Aug. 17, 2023.

Decision to Grant a Patent issued in Corresponding Japanese Application No. 2022-525676, issued Apr. 2, 2024 (plus English Translation).

\* cited by examiner

Figure 4

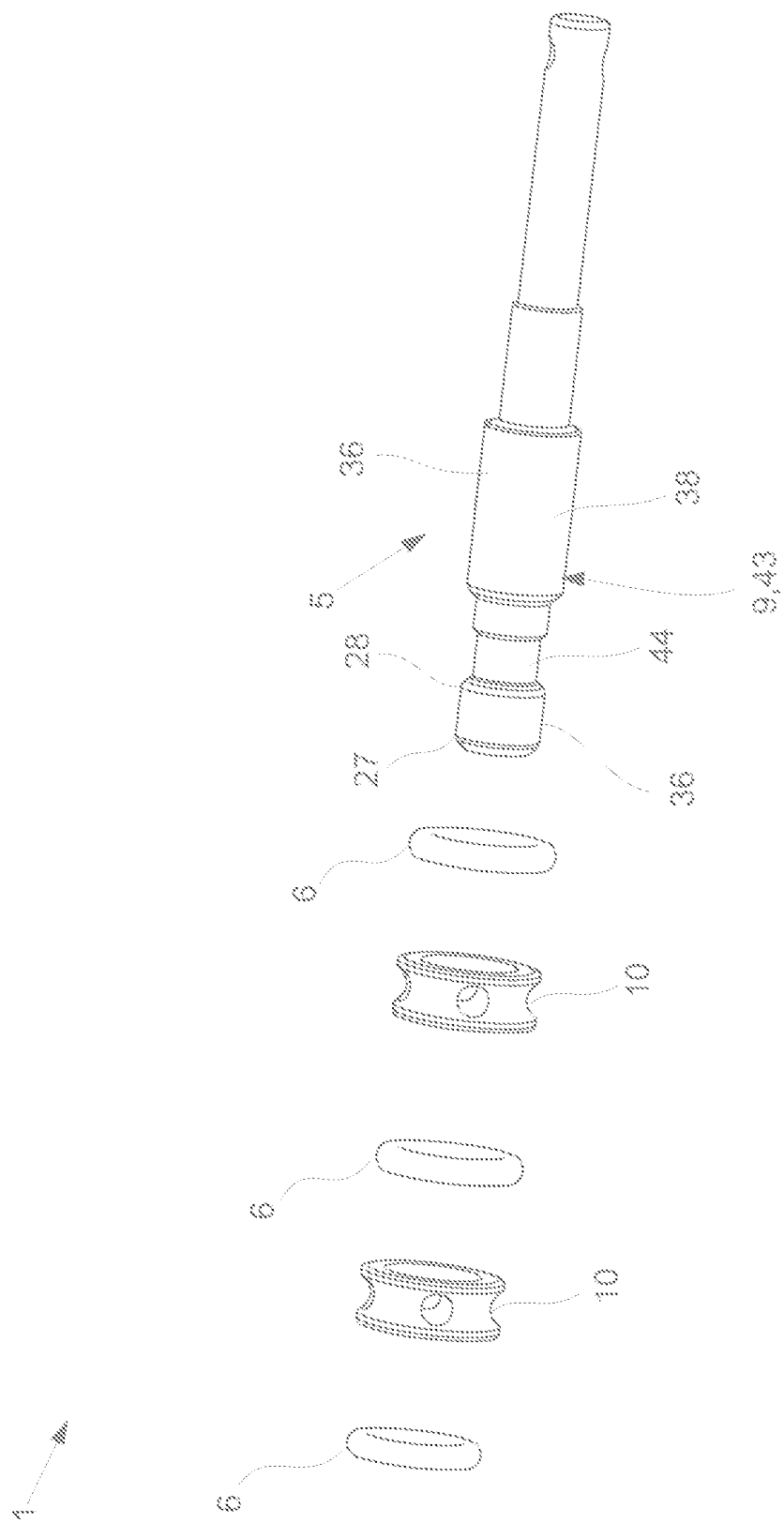

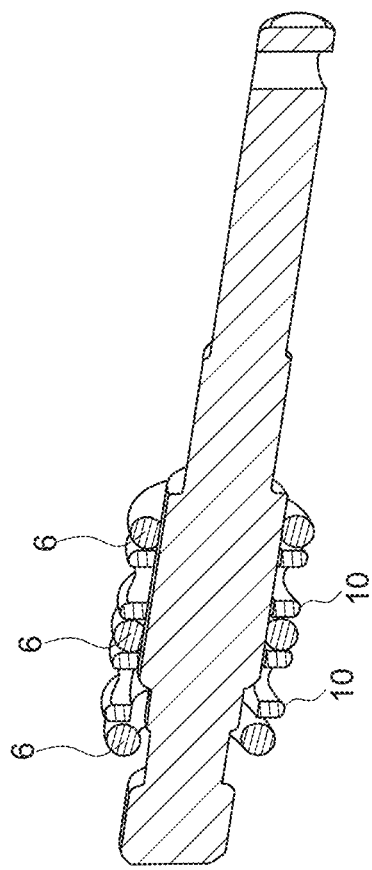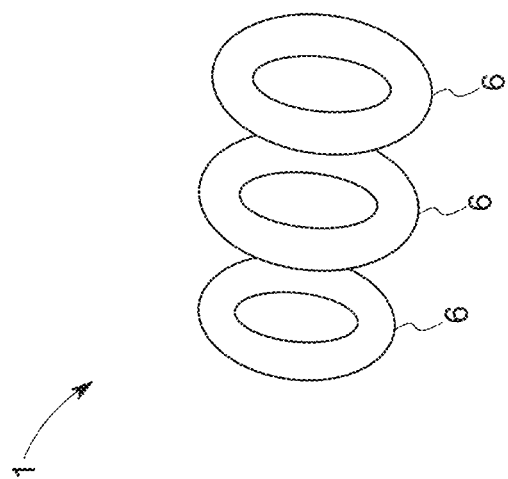
Figure 7

SLIDING SPOOL VALVES, AND METHODS THEREFOR

TECHNICAL FIELD OF THE INVENTION

The present invention relates to a sliding spool valve.

In particular, though not solely, the present invention is directed to a sliding spool valve for use in air or fluid operated tools or machines or the like.

BACKGROUND OF THE INVENTION

Sliding spool valves are often used in pneumatic and hydraulic fluid control systems.

For example pneumatic or hydraulic solenoid, pilot (pneumatic or pneumatic), spring, or manually actuated sliding spool valves are used to control large oil and gas valves with pneumatic actuators fitted, and in large hydraulically powered construction equipment.

They are also used to trigger pneumatic triggering arrangements in air operated tools and equipment such as nail guns.

A spool valve typically has a piston or the like shape contained within a bore. The piston can slide within the bore and is fluidly sealed to the bore, to allow sliding of the piston, but under normal conditions of use remains fluidly sealed to the bore. The movement of the piston then will open one or more supply or exhaust ports to the bore, to allow fluid to move across or along the bore to one or more exhaust or supply ports. In doing so the piston may also close off access from one or more supply or exhaust ports to one or more exhaust or supply ports. Thus it can not only serve as an open or closed valve, but may redirect fluids as needed depending on its linear position relative to the exhaust ports and inlet ports arrangement.

Frequently piston mounted seals are used. These seals are O-rings, lip seals, or similar seals, that are mounted to a piston, for example within a locating groove, and then compressed between the bore and the piston to form the fluid seal. In hydraulic systems, sections of the bore which are sufficiently close in diameter to that of the piston can also act as seals, due to the viscosity of the operating fluid being enough to heavily restrict flow along the gap between the piston and bore, effectively creating a seal. In this manner it is reasonable that a rigid member can be a seal.

Several problems arise with piston mounted seals.

The first of these is assembly. The seal must be located in place on the piston into the locating groove. This can be simple when the piston is simple in shape, and or the locating groove is close to one end of the piston and there is nothing between that end and the locating groove that that o ring cannot stretch over. However, when the locating groove is further down the piston, or there are several seals to assemble, or small diameter seals must be stretched over large sections of the piston, for example in a multi-port arrangement, then moving the o-rings into position can be difficult, as the seals must pass over each locating groove, until they are in the correct one. This assumes the seals are o-rings and can stretch. If the seals, whether o-rings or not, cannot stretch, or have very limited stretch, then such assembly is even more difficult, if not impossible, thus limiting the design options available. Split seals can assist with this assembly issue as they can be opened analogous to stretching an o-ring, but these seals inherently have a leak path and therefore are not always applicable.

Likewise when the valve needs maintenance then removing the seals is difficult, and will often result in the need to replace the seal, even when perfectly serviceable due to the limited methods available to lift a seal out of its locating groove without damaging it.

Further the locating grooves, or other piston features, or other bore other features, often have sharp edges, thus moving the seal over the sharp edge can damage the seal, this occurs whether during assembly or maintenance.

A further drawback of piston mounted seals is that when the seal is mounted on the piston it must then be compressed into the bore with the piston during assembly. Even for a single seal this can create significant sliding friction mentioned below, and can run the risk of damaging the seal on a locating groove edge, or on the entrance to the bore, or on some other feature in the bore. This is worse still if the seal is pinched between the bore and piston, rendering the seal inoperative, leaky, or with a reduced service life.

Also piston mounting the seals presents a problem in available sizing of the seals, and available seal selection, to reduce stiction. Stiction is the friction associated with the static friction of the seal compressed against the sliding surface within the bore, and must be overcome to move the piston relative to the bore. Limited seal selection options can greatly increase the required compression force requirement to generate an effective seal.

In general, the greater the compression required to generate a reliable seal, the greater the stiction. Compression force is made significantly higher when a seal must be pre-loaded by a distance that is a significant proportion of it's cross sectional thickness. The greater the stiction, the greater the actuation component, pressure area, force, or mechanism that must be used to slide the piston relative the bore. This may be acceptable in large machinery where there is ample space, or where high activation force is available. However, where the application requires lower cost, or there is little room for high power actuators, or where the actuation is by hand of a user, this is disadvantageous.

One way to reduce seal stiction for a given pressure rating and seal type is to reduce the absolute or relative (to cross section thickness) compression of the seals. A convenient way to achieve this is by using larger sealing elements. When the seal is piston mounted this can only be done by increasing the size of the locating groove, that is by manufacturing the groove deeper and wider into the thickness of the piston. This can only go so far before the mechanical strength of the piston is compromised due to the reduction in diameter at the locating groove.

A further disadvantage of piston mounted seals is that the bore becomes the wear surface. If the wear surface is damaged, or wears out, through operation, or is damaged through maintenance activities, then the entire apparatus that has the bore located in it must be replaced. This can be expensive, not only in equipment, but also in labour, in multiport operations, and where the apparatus is complex.

In alternative assemblies gland seals are used which are located in machined grooves within the bore, or are mounted between rigidly connected components which between them form the groove to retain the seal.

A similar problem occurs here where the seal must be located into the bore, particularly where piston diameters and bore diameters are small, a bore is deep, seal thickness is high, and there are many seals. In these cases assembly and servicing becomes challenging, time consuming, and often impractical. Where bore mounted seals are used, they mounted in manufactured grooves on the bore. Grooves are generally machined into bores made of metals but can also be cast or otherwise formed into bores made of plastics, metals, ceramics, or any other suitable materials. If multiple components are used to constrain a seal, thereby forming a groove, those components are rigidly mounted relative to the bore. Again seals may be compromised when locating them into the groove within the bore, and or when the piston is slide home during assembly, or removed tor disassembly.

It is easier to increase locating groove size when the seal is bore mounted, however there still must be sufficient material in the bore to allow this. The main problems with increasing groove size in bores are:

1.) when the bores are not large increasing groove and seal size makes assembly more difficult.

2.) Machining deep grooves into small bores is difficult, requires special tooling, and are challenging from a QA/Measurement perspective. These problems are made worse when many are needed to form a multiport valve. This is a disadvantage of bore mounted seals, also known as glands, or gland seals.

An additional benefit of using large cross section o-rings is that it reduces the precision to which the bore and piston must be manufactured. Where smaller cross section sealing elements are used they are easier to assemble, especially in grooves manufactured into bores, but the gap between the piston and bore must be more tightly controlled for reliable sealing operation at a given pressure. The higher the pressure, the smaller the gap must be for a given seal. Larger cross section seals may also be able to wear more than thin section seals, and continue operating as intended.

Enabling easy assembly, disassembly or service of compact spool valves suitable for high and low pressures, using large cross section seals, and with low piston stiction, with little or no specialised tools or labour is therefore desirable.

Further in a multiport situation then the design is often limited to either piston or gland mounted seals, combinations cannot be used as they will foul each other on assembly and disassembly, unless reducing diameters are used. If they are used, then this again limits the design and pressure that can be handled.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved spool valve, or to provide more flexibility in design for spool valves, or reduce the assembly, operation and maintenance cost, or to provide for more compact assemblies, or to overcome the above shortcomings or address the above desiderata, or to at least provide the public with a useful choice.

BRIEF DESCRIPTION OF THE INVENTION

In a first aspect the present invention may be said to broadly consist in a spool valve to valve a fluid between at least one inlet port and at least one outlet port, having a bore with a spool operably associated therein, comprising or including, The bore, having one or more of the at least one inlet port and at least one outlet port, At least one in-bore seal located in the bore, the at least one in-bore seal fluidly sealing on a seal outer diameter to an inside diameter of the bore, and selectively fluidly sealing on a seal inside diameter to a spool outside diameter, At least one spacer located in the bore, adjacent the at least one in-bore seal having a fluid communication from a spacer internal diameter to a spacer external diameter and with the at least one inlet port, or the at least one outlet port, A removable retention component retaining the at least one spacer and the at least one in-bore seal within the bore, The spool, slidingly mounted within the bore to translate along a major longitudinal axis of the bore, having, a first position where the spool prevents fluid flow from the at least one inlet port to the at least one outlet port by fluidly sealing to the at least one in-bore seal, and at least a second position, where the spool allows fluid flow from the at least one inlet port to the at least one outlet port by unsealing from the at least one in-bore seal, Such that a spool valve is formed to allow or deny fluid flow across the valve.

Preferably the valve either allows or prevents fluid flow, but cannot vary the fluid flow.

Preferably there is a second in-bore seal located outwardly a bore entrance.

Preferably the at least one spacer lies directly over, or in line with, the at least one inlet port, or at least one outlet port, it is in fluid communication with.

Preferably the spool has a third position where it allows, or prevents, flow from other, or the same, of the inlet ports to the same, or other, of the outlet ports, or vice versa.

Preferably there are multiple in-bore seals.

Preferably each of the multiple in-bore seals seals, whether selectively or not, to a respective spool outside diameter.

Preferably there is a spacer between each of the multiple in-bore seals.

Preferably the spool contains one or more of the at least one inlet ports, or one or more of the at least one outlet ports.

Alternatively the bore contains all the inlet ports and all the outlet ports.

Preferably the spool is externally actuated by an actuator on one end at or towards a bore entrance.

Preferably the spool is biased in a first direction by an elastic element, such as for example, but not limited to, a spring.

Preferably the spool is moved in a second direction, opposite the first, by fluid pressure on the spool, or part thereof.

Preferably the spool has an engagement end, at or toward an external entrance to the bore, and an operative end, distal from the engagement end, located within the bore at least for the first position or the second position.

Preferably the engagement end is a piston.

Preferably the actuator acts on the operative end.

Preferably fluid pressure can act on the piston to slide the spool from the first position to the second position, or vice versa.

Preferably a, or the, spool outer diameter is supported on a spacer inner diameter of the first spacer acting as a support or guide surface.

Preferably the spacers are separate to the respective in-bore seal(s) they space apart.

Alternatively one or more of the spacers is connected to at least one of the in-bore seals it spaces.

Preferably the fluid communication is provided by at least one aperture through from the spacer internal diameter to the spacer external diameter.

Preferably the external diameter is recessed about the external periphery of the spacer, to provide the fluid communication from the at least one aperture to the at least one inlet port, or at least one outlet port.

Preferably the components of the in-bore seal(s), spacer(s), are removable by slidingly removing from the bore along the major longitudinal axis once the retention component is removed.

Preferably removal of the retention component also allows removal of the spool.

Preferably there is at least one permanent in-bore seal fluidly sealing between the bore and in sliding sealing contact on an external surface of the spool.

Preferably sealing is achieved through radial pressure of the in-bore seals against the inner diameter of the bore, and outer diameter of the spool, in other words sealing occurs on surfaces parallel to the major longitudinal axis.

Preferably the in-bore seal(s) have any one of a circular, square, or lip seal cross section.

Preferably a leading edge and or trailing edge of the sealing surface of the external diameter is tapered to provide a transition for the in-bore seal when sealing and unsealing to the external diameter.

Preferably the in-bore seals only apply pressure in the longitudinal direction directly on the bore, or a spacer, but not on another in-bore seal, whether directly or indirectly.

Preferably the spool contains one or more passage, whether open along their length, or closed to the spool outside diameter that allows additional flow path tor the fluid.

In another aspect the present invention may be said to broadly consist in a method of providing a spool valve to valve a fluid between at least one inlet port and at least one outlet port, Comprising or including the steps of, Providing a bore having one or more of the at least one inlet port and at least one outlet port, the bore having one Sliding a spool linearly at least in part within the bore, Sealing an internal diameter of the bore, using at least one in-bore seal, between the internal diameter and in selective sliding engagement with an external diameter of the spool, Spacing the at least one in-bore seal within the bore using at least one spacer, Retaining the at least one in-bore seal, the at least one spacer, and the spool within bore, such that at least one spacer retains the at least one in-bore seal, Sliding the spool so that it is in selective sliding engagement between a first position where the external diameter is clear of the at least one in-bore seal to allow fluid flow from the at least one inlet port, to the at least one outlet port, and a second position where the external diameter is sealed to the at least one in-bore seal to prevent fluid flow from the at least one inlet port, to the at least one outlet port, Such that a spool valve to control fluid flow is provided.

Preferably the method includes sealing on the external diameter through radial forces.

In another aspect the present invention may be said to broadly consist in a spool valve to valve a fluid, comprising or including, A bore having one or more inlets, and one or more outlets, A spool slidingly operable within the bore, One or more in-bore seals contained within the bore the in-bore seal fluidly sealing on a seal outer diameter to an inside of the bore, and selectively fluidly sealing on a seal inside diameter to a spool outside diameter, At least one spacer located in the bore, adjacent the at least one in-bore seal having a fluid communication from a spacer internal diameter to a spacer external diameter and with the at least one inlet port, or the at least one outlet port, A removable retention component retaining the at least one spacer and the at least one in-bore seal within the bore, Wherein the spool slides between at least two positions, a first of which prevents flow from at least one of the one or more inlets, to at least one or more of the outlets via a sealing of at least one of the in-bore seals on at least one spool outside diameter, and a second of which allows flow from at least one of the one or more inlets, to at least one or more of the outlets by an unsealing of at least one of the in-bore seals on at least one spool outside diameter.

In another aspect the present invention may be said to broadly consist in a spool valve as described herein with reference to any one or more of the accompanying drawings.

In another aspect the present invention consists in a method of providing a spool valve as described herein with reference to any one or more of the accompanying drawings.

In another aspect the present invention consists in a kit of parts for servicing or retrofitting an existing spool valve as described herein with reference to any one or more of the accompanying drawings.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification which include that term, the features, prefaced by that term in each statement, all need to be present, but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference.

This invention may also be said broadly to consist in the parts, elements and features referred to or indicated in the specification of the application, individually or collectively, and any or all combinations of any two or more of said parts, elements and features, and where specific integers are mentioned herein which have known equivalents in the art to which this invention relates, such known equivalents are deemed to be incorporated herein as if individually set forth.

Other aspects of the invention may become apparent from the following description which is given by way of example only and with reference to the accompanying drawings.

BRIEF DESCRIPTION OF THE DRAWINGS

Preferred forms of the present invention will now be described with reference to the accompanying drawings in which.

DETAILED DESCRIPTION OF THE INVENTION

Figure 1C:
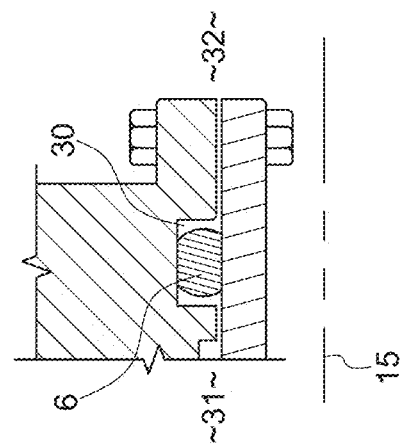
FIG. 1A Shows a partial cross section through a typical piston mounted seal in a location groove, in sliding sealing contact with an internal diameter of a bore, B Shows a similar cross section to FIG. 1A, but where the seal is mounted in a gland style on the bore, and is in sliding sealing contact with an external diameter of the piston, C shows a static non-sliding face seal between two component, FIG. 2 Shows a vertical cross section through an assembly in keeping with the present invention, showing the bore in an apparatus, the spool, in-bore seals, spacers, inlet ports, outlet ports, and retention component, FIG. 3 Shows a similar view to that of FIG. 2, but in isometric view, FIG. 4 Shows an exploded view of the assembly of FIGS. 2 and 3, FIG. 5 Shows a close up of the spool, spacers, and in-bore seals and driving element, FIG. 6 Shows an exploded diagram of FIG. 5 showing one form of the spool, FIG. 7 Shows a cross section of FIG. 5, FIG. 8 Shows an isometric view of the spacer, FIG. 9 Shows an alternative version of the spool in isometric view, where there are additional grooves, in this case to a common volume, FIG. 10 Shows a vertical cross section of a further alternative spool similar to FIG. 9, showing alternative flow paths a passageways from one area of the spool to another, FIG. 11 Shows a close up of the alternative flow paths of FIG. 10, FIG. 12 Shows a cross section through the apparatus showing the bore and inlet and outlet ports.
Figure 1B:
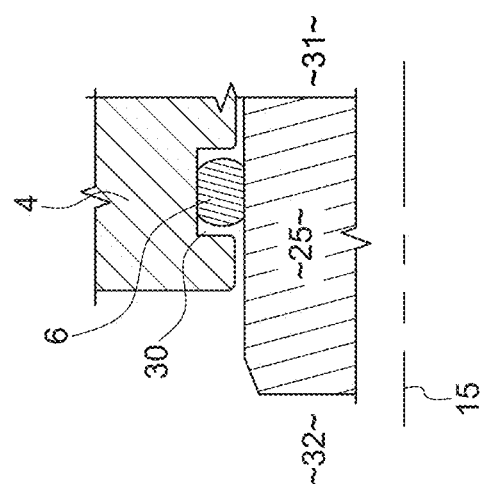
Figure 1A:
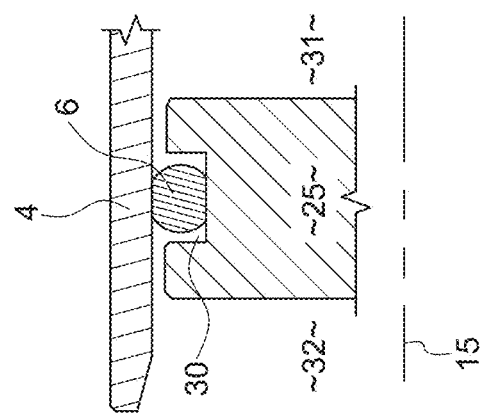

Types of sealing arrangements for linear sliding, or spool valves are shown in partial cross section in FIG. 1A through 10. FIG. 1A shows the seal 6 mounted within a locating groove 30 on a piston 25. The piston 25 and seal 6 are mounted within a bore 4, and can slide along longitudinal axis 15. The seal 6 is compressed between the bore and the piston to retain a fluid on a seal first side 31 at a first pressure and prevent it from moving to the seal second side 32, at a second pressure.

FIG. 1B shows a similar arrangement to that of FIG. 1A except the seal 6 is mounted within a groove 30 on the bore 4. Again the piston 25 slides along the longitudinal axis 15, and in this case the seal 6 is stationary, relative to the piston 25.

Figure 9:
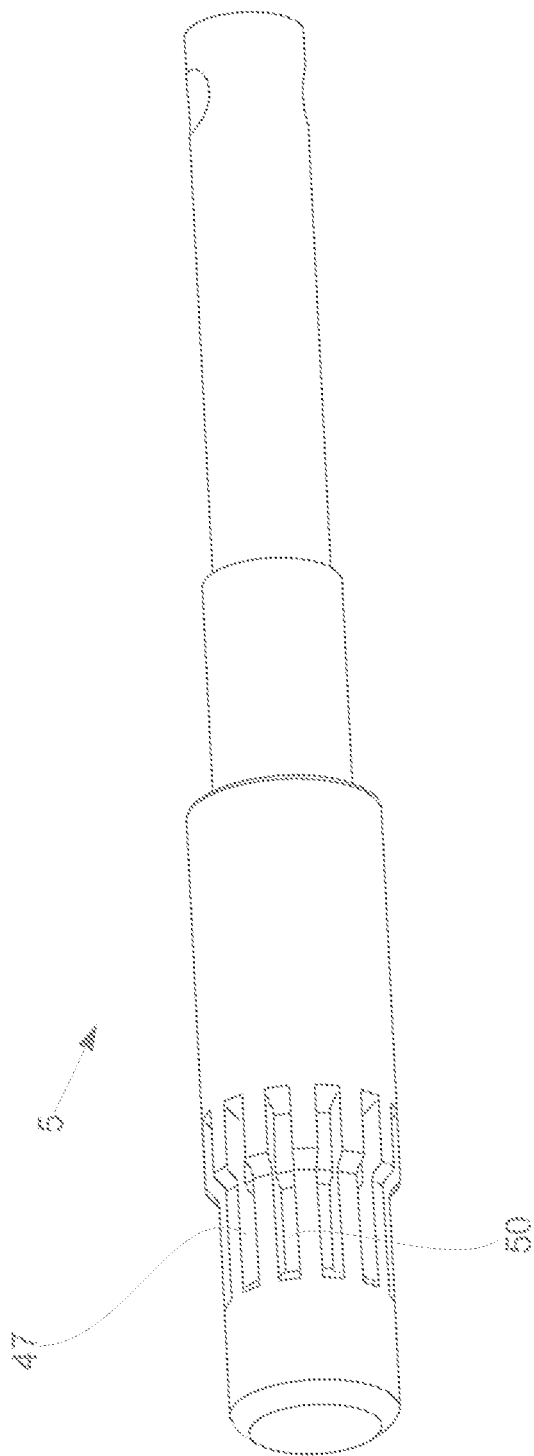
Figure 10:
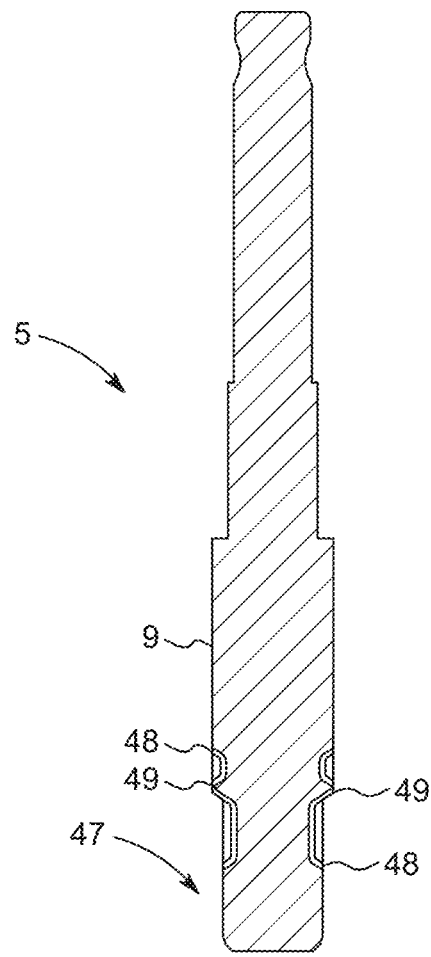

A static example, for comparison, is shown in FIG. 10 where a seal 6 is mounted in a groove 30 and is compressed between two components, again to prevent a fluid at a first pressure on a first side 31 from moving to a second side 32 at a second pressure. Preferred embodiments will now be described with reference to FIGS. 2 through 13. The spool valve 1 is a sliding or linear action movement fluid control valve of the type that has more than one distinct stable position in which the available flow paths, for example from inlet port 2 to outlet port 3 through the valve are distinct from at least one of the other stable positions.

A linear sliding or spool valve 1 in keeping with the present invention is shown in FIG. 2 through 13.

Figure 2:
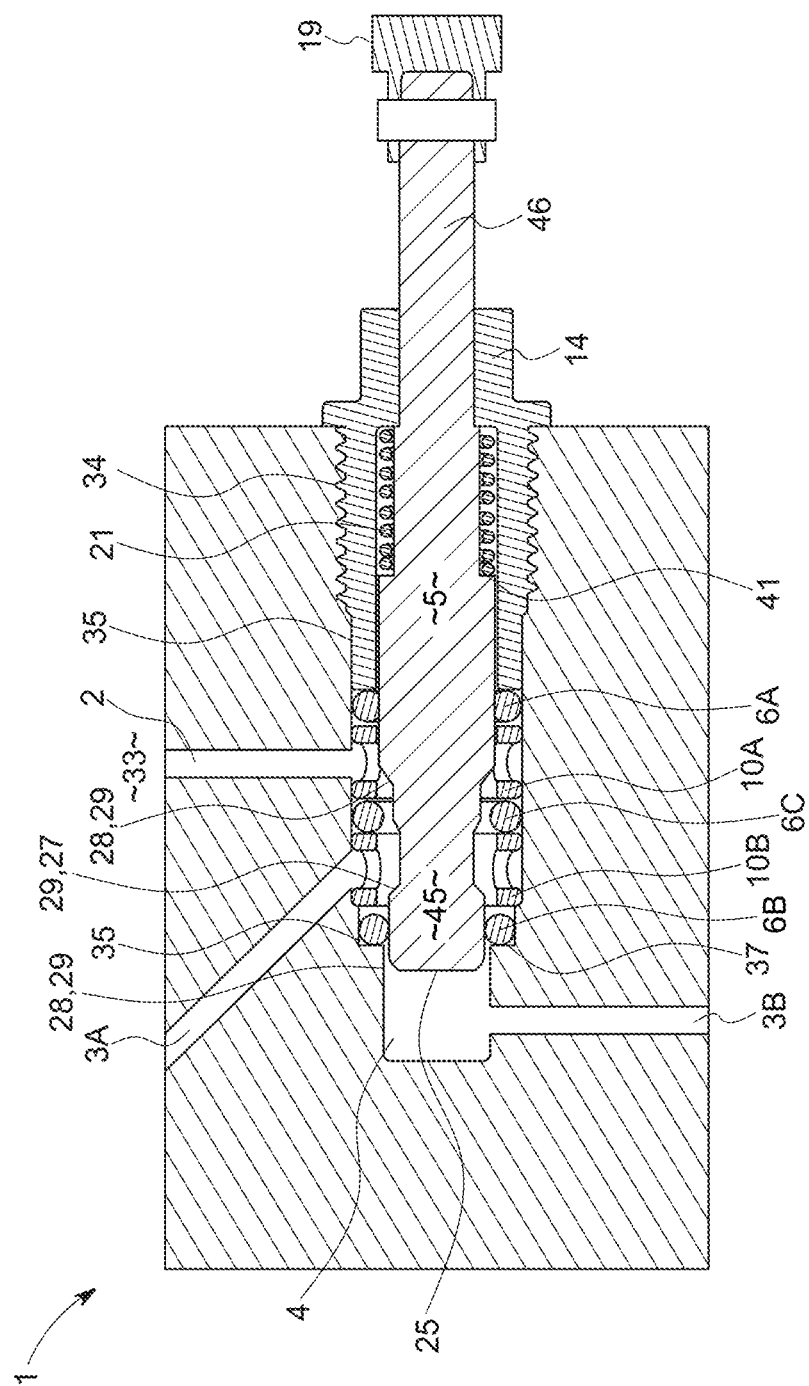
Figure 3:
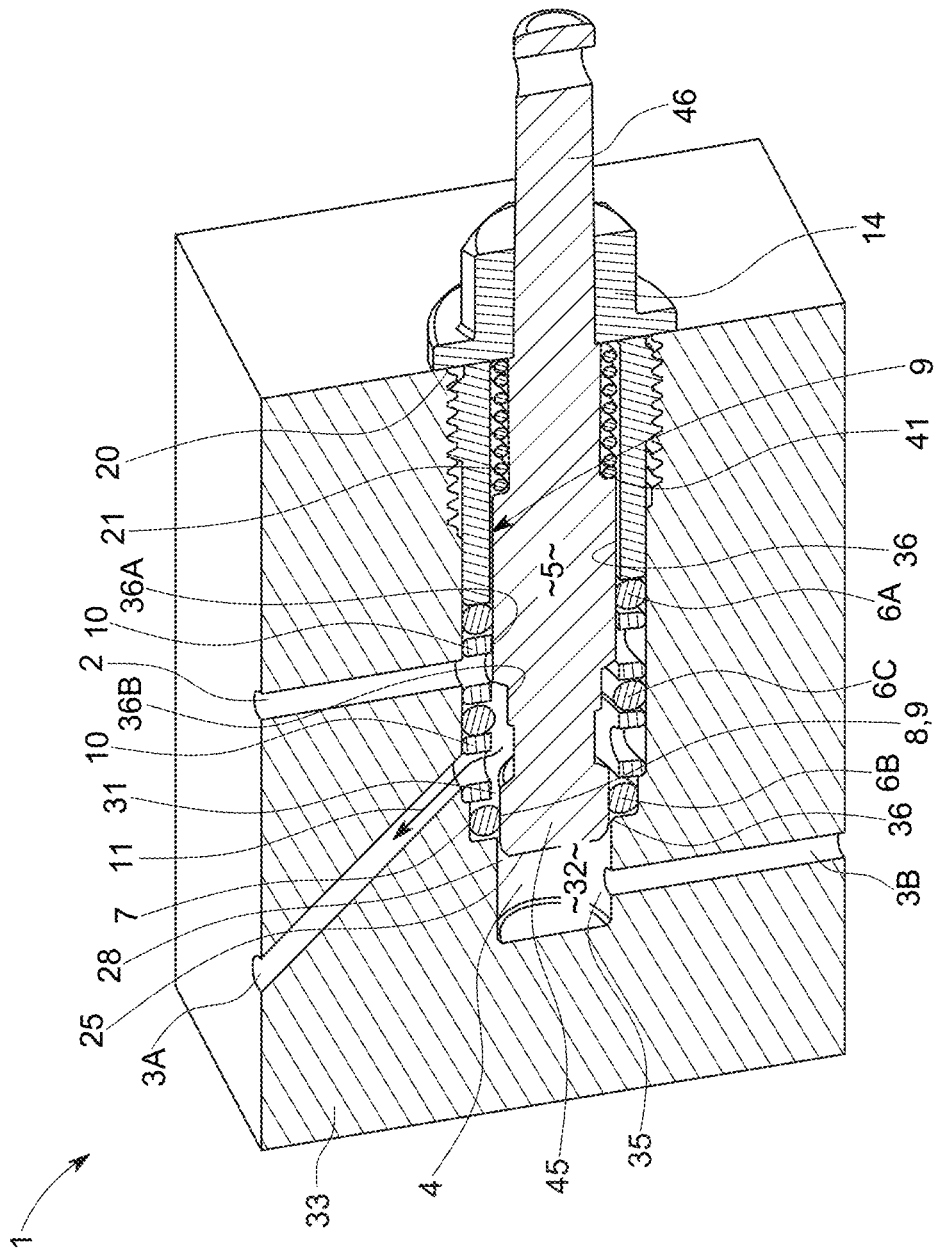

A cross section of a spool valve 1 is shown in FIGS. 2 and 3. The spool valve 1 consists of a bore 4 within a body 33, for example in apparatus, or a valve body or similar. Typically the bore 4 is circular in cross section. However, it may be any shape that a corresponding spool 5, seals 6 and spacers 10 can confirm to and valve in (described below). The bore has an inlet port 2, and two outlet ports 3A and 3B, that are in fluid communication with the bore 4. The bore 4 may be drilled, bored, machined, or otherwise manufactured in the body 33. As shown it may be of a single or various internal diameters 35 or cross sections in a metal, polymer, ceramic, or composite material body 33. The bore 4 may be blind and partially threaded 34 as shown at one end. Alternatively the bore 4 may be open at both ends and then closed by another body sealed thereto. The bore 4 as shown may be a blind one, that is there is a bore entrance 20, and no exit other than the fluid inlets 2 and outlets 3. In other forms the bore may be open at either end, that is it has two bore entrances 20, one at each end, whether through a single body 33, or two or more bodies 33 connected together.

The fluid inlet port(s) 2 and fluid outlet port(s) 3 may connect the bore to the atmosphere, pressure supplies, enclosed volumes, or flow paths that require the valved fluid(s). As shown there may be more than one inlet 2 or outlet 3 separated along the bore's 4 longitudinal axis 15 and the inlets 2 and outlets 3 may be at any angle and at any orientation along the bore. As shown the inlets 2 and outlets 3 open onto the bore 4 circumference, that is its inside diameter 35.

Within the bore 4 is a spool 5 that matches the cross-section of the bore 4, though it is of reduced diameter to that of the bore. The spool 5, in the embodiment shown is biased in the position by a biasing element 21 such as a spring. However, in other embodiments there may be no biasing element, and the spool is moved as needed by an actuator whether internal or external to move the valve into the required position. For example the actuator 19 may act on the engagement end 46 of the spool. In the form shown the biasing element 21 bears on a portion, in this case a spool shoulder 41 of the spool b and a retention component 14. The spool 4 also optionally has a piston 25, which operation is described later, at an operative end 45. The spool 5 is centrally located on the longitudinal axis 15 and is moveable so it can slide or translate along the axis 15. The spool 5 has one or more cylindrical sealing surfaces 36 on its outer diameter 9. The spool 5 has no grooves or similar and does not retain an o-ring or other form of seal 6 in the sliding axis. The sealing surfaces 36 are parallel with the axis of movement, along the longitudinal axis 15, of the spool 5. The spool 5 is shaped and sized such that it encounters a limit to it's motion in both directions along the longitudinal axis via a component rigidly connected to the body in some manner for example the retention component 14 in a direction toward the bore entrance 20, or by encountering the body of the bore for example, in the opposing direction.

As shown the spool 5 has several changes in diameter 9 providing lands 43 to engage the seals 6, and undercuts 44 to allow fluid flow past the seal 6. The leading edge 27 and trailing edge 28 of the changes in diameter are tapered, or as shown, rounded 29. The reason for this is explained shortly.

Figure 11:
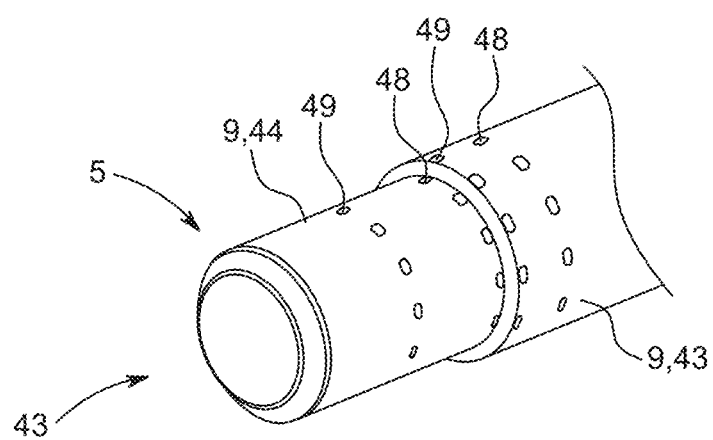
Figure 12:
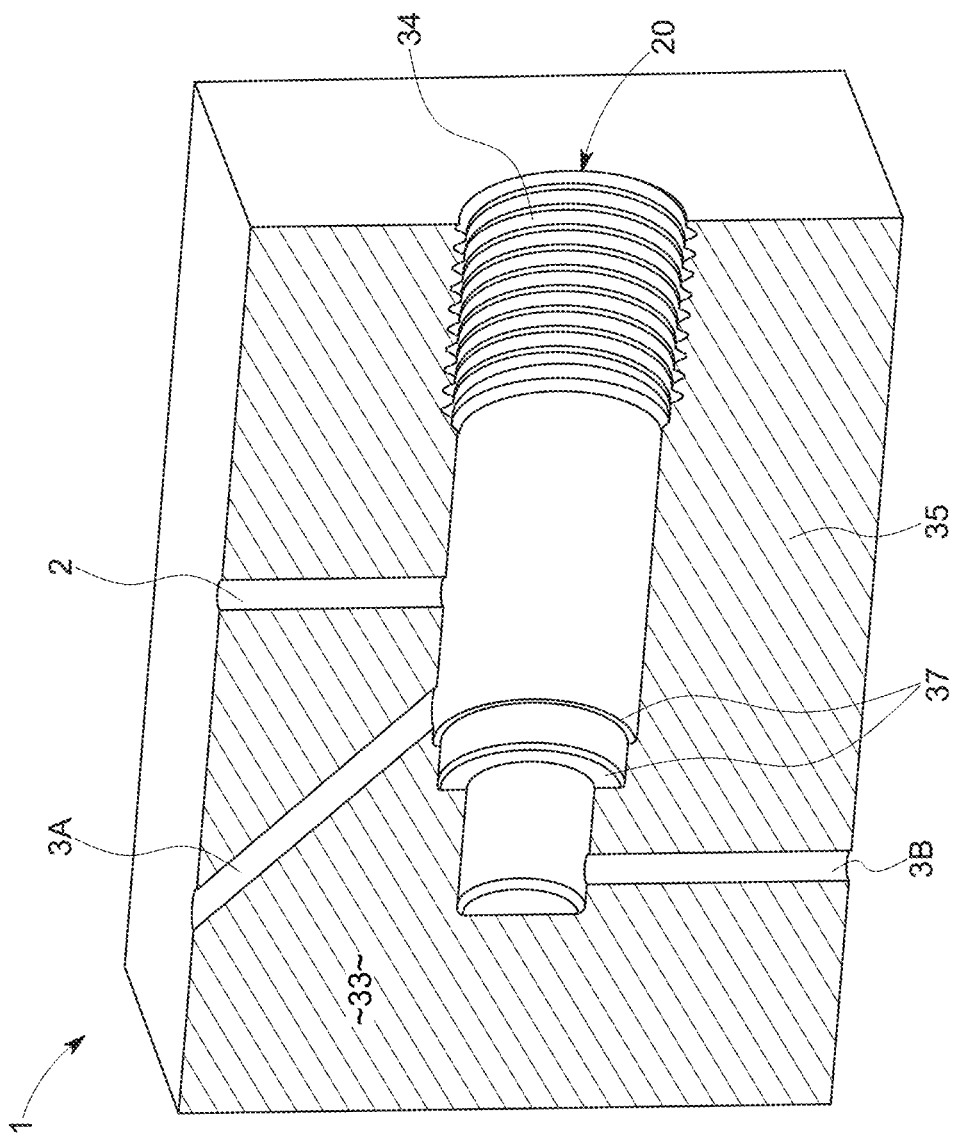

Further variations of the spool 5 are shown in FIGS. 9 through 11. Rather than, or in addition to, undercuts to allow fluid flow there is at least one passage 47, and preferably several running along the spool 5. The passage 47 may be formed as a groove forming an open passage 47 that fluidly communicates into a common volume 50 as shown in FIG. 9. Alternatively the passage 47 may be close formed as a connecting fluid pathway, with an opening 48 and an exit 49 in any direction from one region of the spool to another as shown in FIGS. 10 and 11.

The passage 47 may allow additional flow area for the fluid, for example when the spool 5 diameter becomes too small. Additionally, or alternatively the passage(s) 47 may allow additional flow paths that miss one or more seals or inlet or outlet ports to provide additional valving functionality that would not be present if the flow path was only along the spool outside diameter 9.

Such variations as shown of the spool 5, may be made by machining, or additive manufacturing to provide the passage(s) 47.

As shown there are a number of in bore seals 6 within the bore 4. The seal outer diameter 7 seals against the adjacent bore inside diameter 35. The seal inside diameter 8 seals against the adjacent spool outside diameter 9. As the seal b is compressed between these two diameters it forms a seal against fluid moving from a seal first side 31 to a seal second side 32. The spool 5 moves linearly relative to the in bore seals 6, and the in-bore seals 6 are stationary in relation to the bore 4. The seal inside diameter 8 is in sliding sealing contact with the spool outside diameter 9, at least when in contact there with.

Such sealing contact can happen in at least two situations. The first is where the in bore seal 6 is always in contact with the spool outside diameter, such as in-bore seal 6a. Although the spool 5 will move relative the in bore seal, at no point in normal operation of seal 6a will it be free of the sealing surface 36A on the spool 5. Spool valves will frequently include these types of seals 6 which are never disengaged, and act to permanently separate chambers or eliminate flow paths. For example as shown in FIG. 2 seal 6A has the function of preventing fluid on its in-bore side from leaking to atmospheric, that is to the bore entrance 20.

Figure 13A:
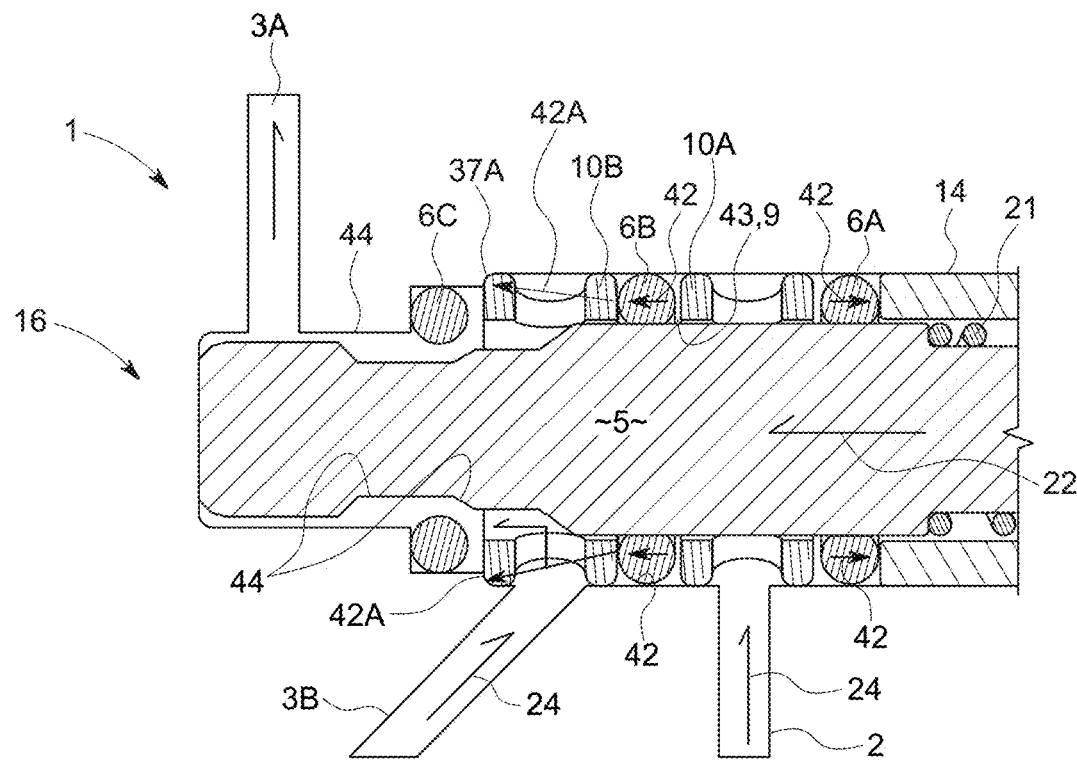
FIG. 13A shows the spool valve in vertical cross section with the spool in a first position, and B shows the spool valve in vertical cross section with the spool in a second position.

The second form of sealing contact, selective sealing and unsealing is based on the translation of the spool 5 and optionally variations in the spool outside diameter 9. The spool 5 as shown and described can have various reduced diameter portions 9, grooves, or internal flow paths adjacent cylindrical sealing surfaces 36, allowing for selective sealing and unsealing as the spool 5 moves from a first position 16 to a second position 17, such as shown in FIG. 13. For at least one sealing element 6c or 6B in FIGS. 2 and 3, when disengaged from the sealing surface 36, due to movement of the spool 5, it encircles a reduced diameter, section, or shape portion of the movable sealing element. Therefore, sealing surface 36B can become free of in bore seal 6C as the spool slides under normal operation to the position shown. In contrast with sufficient translation to the left in FIGS. 2 and 3, the spool 5 can be clear of seal 6B and allow fluid to pass from port 2 to port 3A, such as shown in FIG. 13A.

The sealing surface 36 is parallel to the motion of the spool 5, the seal does not and cannot rely on directly generating compressive load on the seal 6 in the direction of movement of the spool 5 to create a seal, the seal is only formed by the compression of the seal radially between the bore inside diameter 35 and the spool outside diameter 9. The sealing surface (seat) can be an internal cylindrical surface, or an external surface. The seal is not by the movement of the moving element compressing the seal 6 in the direction of the moving element in order to create the seal. The elastic element of the seal 6, when in a sealing position, is compressed or stretched entirely perpendicularly to the longitudinal axis 1b, that is radially, in order to create the seal between the bore 4 and the spool 5. That is, to generate a seal from the unsealed state the movement of the spool 5 makes the seal 6 encounter a cylindrical (or other locally constant & smooth cross section) sealing surface 36 with an appropriately ramped or rounded, rounded, ribbed, or special geometry lead-in edge or surface 27 or lead out edge or surface 28 to allow the smooth transition of the seal 6 from sealing to not sealing, or from not sealing to sealing on the spool 5.

The maximum amount of reduction in diameter, or the newly introduced flow path size, is related to the cross sectional thickness of sealing elements 6. The reduction in diameter in relation to the sealing diameter, or the flow area of a groove or other introduced flow path through or around the spool 5 shall not exceed the cross sectional thickness of the sealing element, and will typically be a small fraction of that thickness, say between 10 and 30% of that dimension.

To allow easy transition of the seal 6 onto and off the sealing surface 36 the leading edge 27 and trailing edge 28, as described above are tapered or rounded 29. This is also a useful feature to allow for easy of assembly and disassembly and reduces the likelihood of seal damage. Various cross section or composite sealing elements are viable in this application.

The seals 6 are most typically O-rings made of nitrile rubber or other polymer. Less commonly the seal 6 will be comprised of non-circular section sealing elements such as lip seals, square section seals. In hydraulic arrangements seals 6 may be comprised of accurately manufactured rigid sealing faces, features, or bodies using small gap viscous flow to generate sufficiently effective sealing. Materials can also vary widely and can even be made of composite materials or multiple materials.

Figure 4:
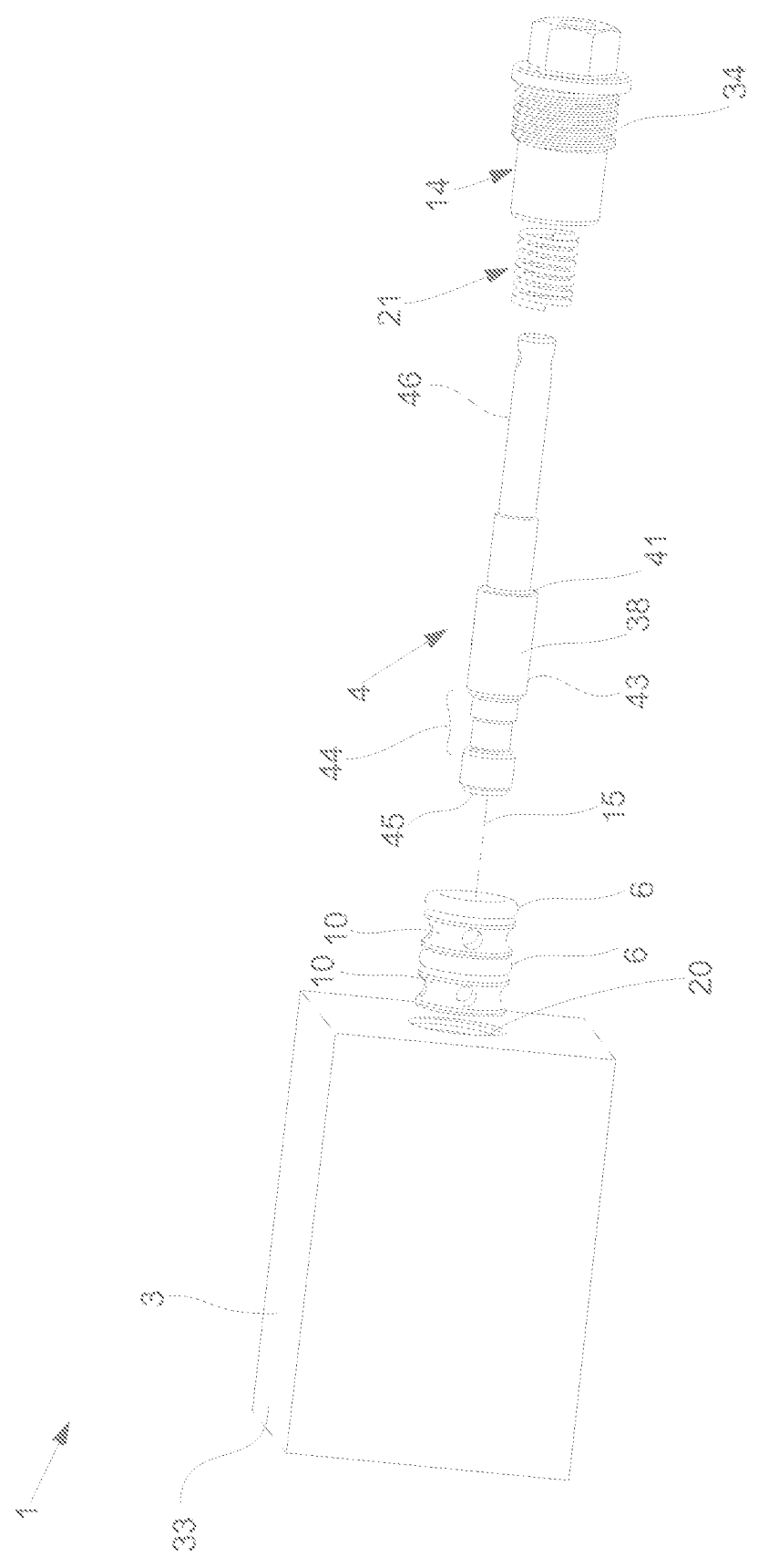
Figure 6:
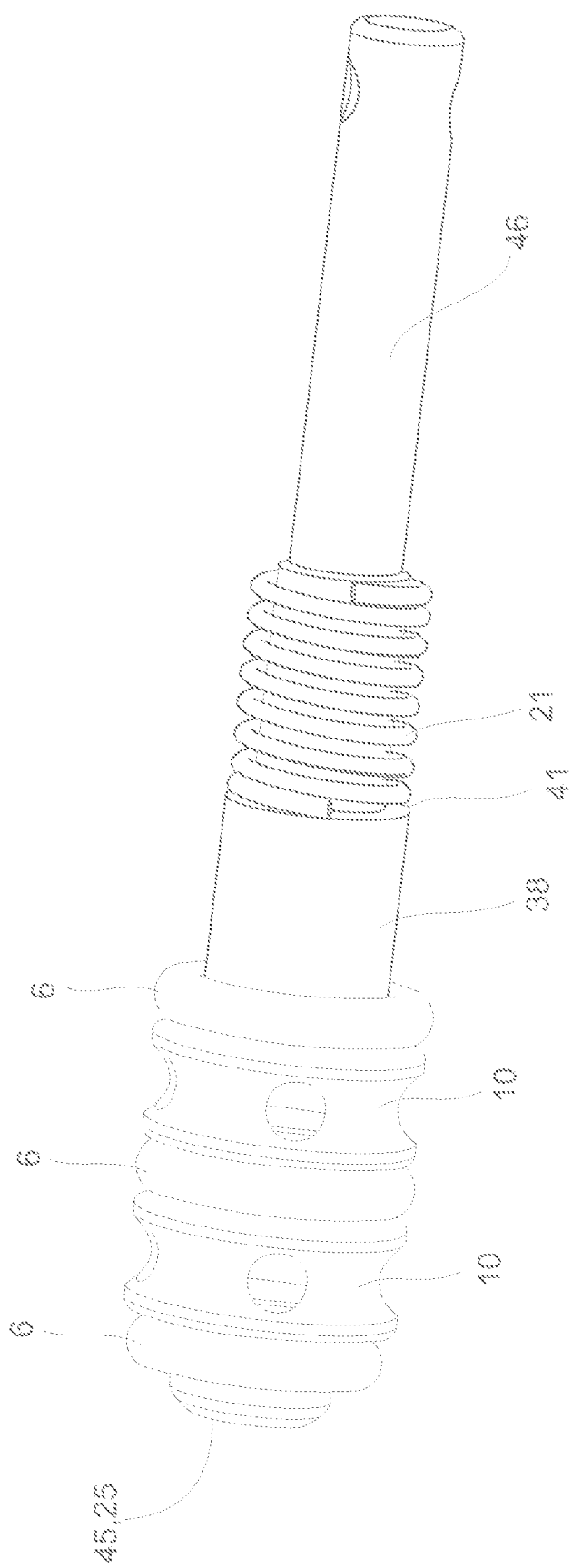
Figure 8:
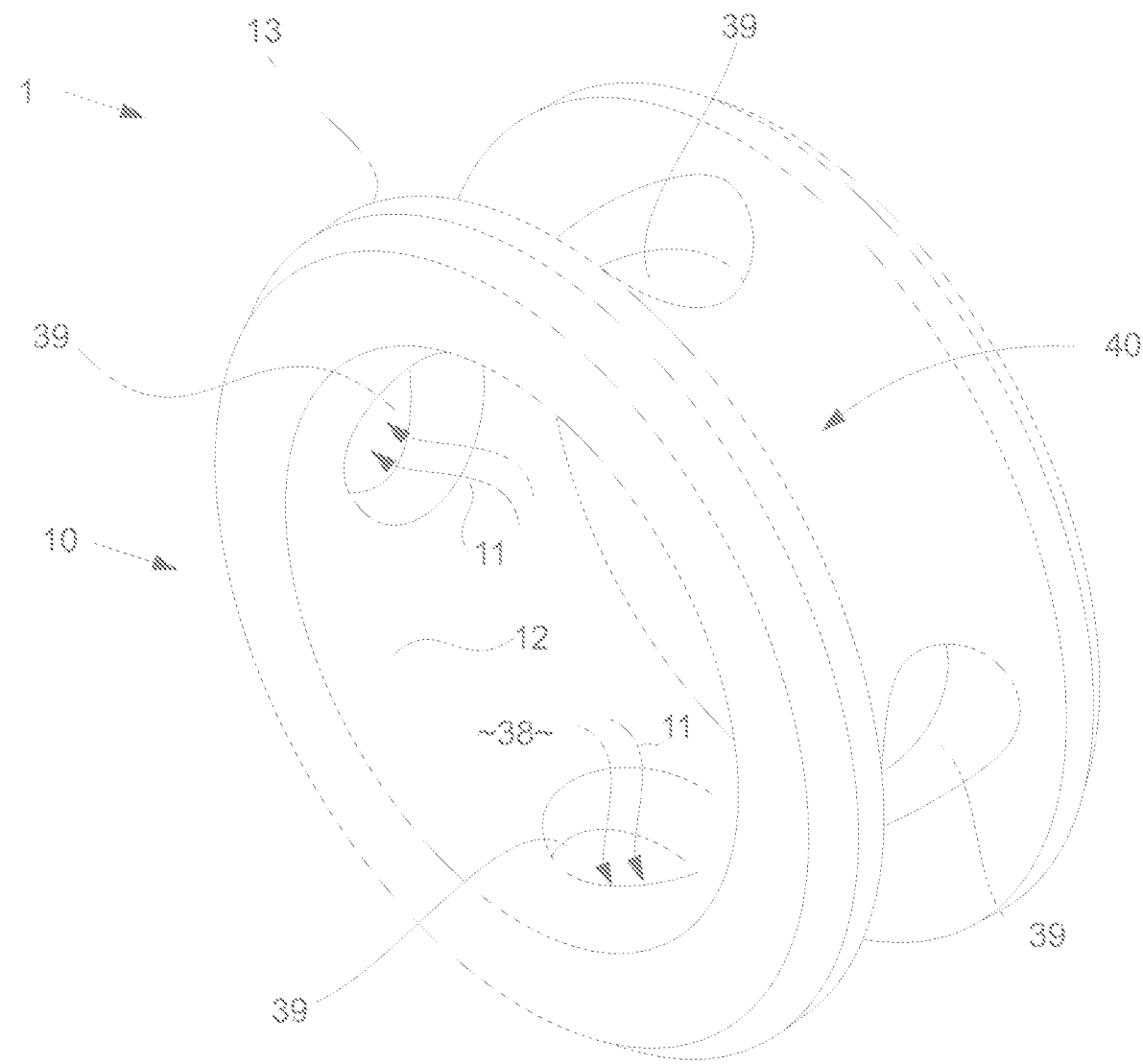

Present also is a floating spacer 10 between, and separating the, in bore seals 6 as shown in FIGS. 8 and 5. The spacer 10 is not fixed to the bore inside diameter 35, and is hence floating. Instead it is sandwiched between the seals 6 and the retention component 14 (described shortly). In the preferred form the spacer 10 can slide into place as part of assembly of the spool valve 1, and slide out of place as part of the disassembly of the spool valve 1, as shown in FIGS. 4, 6 and 7. In some forms the spacer 10 may be an interference fit with the bore, however this is not as desirable as it may cause assembly and disassembly issues.

The spacer 10, seal 6, retention component 14, and bore length are sized such that once they are assembled into the valve the seals 6 and spacers 10 can only move a small amount along the longitudinal axis. The amount of free movement of spacers 10 or seals 6 within the bore 4 in the assembly is sufficiently low such that there is no position available, when pressurised or depressurised, where a seal 6 can interact with a port 2 or 3 which is in alignment with a spacer 10. The enable assembly there is free movement, but this is generally less than the cross sectional thickness of a sealing element 6.

Once pressurised under normal operation, the free movement of floating spacers 10 may increase substantially due to the pressure force compressing a seal or seals 10 away from the adjoining floating spacer(s) 10, thereby allowing it additional free movement within the bore 4. In these cases, the movement of seals 6 and adjacent floating spacers 10 due to pressure is designed to not cause or allow a seal 6 to interact with a port 2 or 3.

In other forms there is a compression fit longitudinally of the seals 6 and the spacers 10 such that there is no free movement of the seals 6 and spacers 10, other than due to deformation of the seals 6 during translation of the spool 5.

The arrangement of the spacers 10, seals 6, and inlet ports 2 and outlet ports 3 is such that the seals are not located over the ports 2 and 3. Working from right to left in FIG. 2, seal 6A is clear of inlet port 2, and is prevented from moving over the inlet port 2 by the spacer 10A. Likewise seal 6C is held clear of inlet port 2 and outlet port 3A by spacers 10A and 10B. Seal 6B is prevented from moving over outlet port 3A by spacer 10B, and from moving over outlet port 3B by the shoulder 37. In this way the seals 6 when assembled are located between or beyond (but not in contact with) the drilled or otherwise manufactured inlet and outlets 2 and 3 respectively in the bore 4.

The spacers as shown in FIG. 8 have a spacer internal diameter 12 and a spacer external diameter 13. The spacer external diameter 13 as described is a close or interference fit with the bore internal diameter 35, at least such that it is largely prevented from moving radially. Likewise the spacer internal diameter 12 is a close fit with the spool outside diameter 9. In this way the spacer may have a finished internal diameter 12, whether hardened, polished or coated, to provide a support or guide surface 38 with the spool outside diameter 9. Likewise the spool outside diameter 9 may also, or instead of, be hardened, polished or otherwise coated, to provide as low friction surface as possible against the seals 6, and spacers 10.

The spacers 10 and their external diameter 13 and the bore inside diameter 3b and shoulders 37 interact such that the force generated by pressure contained by a seal 6, is not passed through to another seal 6 before being transmitted to the body or other rigidly mounted member.

In other words when a pressure force (or net pressure force) acts on a seal 6 to slide it along the bore 4 towards a port 2 or 3, if the seal is adjacent a spacer 10, then that spacer 10 is supported such that the seal 6 cannot interact with that port 2 or 3. The force that restrains that spacer 10 to prevent the seal 6 engaging the port 2 or 3 has to come from somewhere—either the bore itself for example from a shoulder 37 or other feature, another rigidly mounted component, or by another seal 6 in compression. This preferred form is illustrated in FIGS. 13A and B, where a seal 6 does not directly or indirectly support (via a spacer 10) another seal 6; in no position or pressure state does a force generated by a seal 6 as a result of pressure, act through another seal 6. Therefore ideally seals 6 only generate forces by restraining pressure, they don't transmit a force generated by pressure and act on another seal 6.

In FIG. 13A the force 42 acting on the spacers 6A and 6B is shown in the longitudinal direction. For seal 6A this force is taken by the retention component 14. For seal 6B the force 42 is against the spacer 10B, which in turn bears on shoulder 37A. In FIG. 13B again the force 42 for seal 6A is taken by the retention mechanism 14. For seal 6C the force 42 is taken by the seal 6C bearing directly on shoulder 37B.

While in the present invention we could pass these loads through seals 6, it is preferable in terms of seal life and ease of actuation.

In the preferred form the way to restrict movement, and constrain pressure force, is to use shoulders 37 in the bore 4, or other rigidly mounted components, and generally not by compressively loading another seal.

As shown in FIG. 8 there is a fluid path 11 from the spacer internal diameter 12 to the spacer external diameter 13. In the embodiment shown there are a plurality of apertures 39 in the spacer, although one is sufficient, from the spacer internal diameter 12 to the spacer external diameter. Also in the preferred embodiment there is a recess 40 running circumferentially about the spacer external diameter 13. The result is that when the spacer 10 is exposed to fluid, for example on its internal diameter 12, the fluid can pass through the spacer 10, via the aperture(s) 39 to the spacer external diameter 13. To aid the flow of fluid, once at the external diameter 13, the spacer has the recess 40, groove, or other allowance to provide communication from the aperture 39 to the inlet 2 or outlet port 3 the spacer sits over. This is useful as the aperture 39 may not always sit over, or be aligned, with the respective inlet or outlet port. This removes the need to have complex alignment tools or geometry of the spacer 10 with the bore 4. The spacers 10 are grooved, shaped, drilled, or otherwise manufactured such that flow is allowed around the spacer external diameter 13 and radially through the spacer thickness.

Retaining the assembly of the spool 5, seals 6, and spacers 10 in the bore 4 is a retention component 14. In the embodiment shown for example in FIGS. 2 and 4 this is a threaded hollow component that thread wise engages via its external thread, a mating internal thread in the bore 4. Captured between the retention component 14 and a spool shoulder 41 is the biasing component, which in the example shown is a spring. This biases the spool to the left in FIG. 2. The retention component 14 or assembly is used to locate seals 5 and spacers 10 on assembly. As stated the retention component 14 is typically threaded directly into the body, however the retainer may use any complimentary fitting between the retention component 14 and the bore 4 or body 33, or similar method to support the sealing or spacer elements against the resultant pressure forces, such as, but not limited to circlip retention, bayonet or similar fittings, perpendicular locking screw retention, shear pin/key retention, externally fixed, for example by plate and threads, or sandwiched between the body 33 and a face plate. The retainer 14 or retainer assembly may include threaded members to allow for bias 21 pre-compression adjustment. This may be useful when the operating pressures vary. A 'force bias spring' may be used to increase or decrease the load required to move the moving member between it's N states, for example to overcome the stiction.

As described movement of the spool 5 will block and unblock the fluid path between one or more inlets 2 and outlets 3 and so will act as a valve for the fluid. It is clear the spool 5 cannot act to control the rate of flow, but can only open or close a path from an inlet to an outlet, thus the valve is not a variable one, it can only allow or deny fluid flow.

Figure 13B:
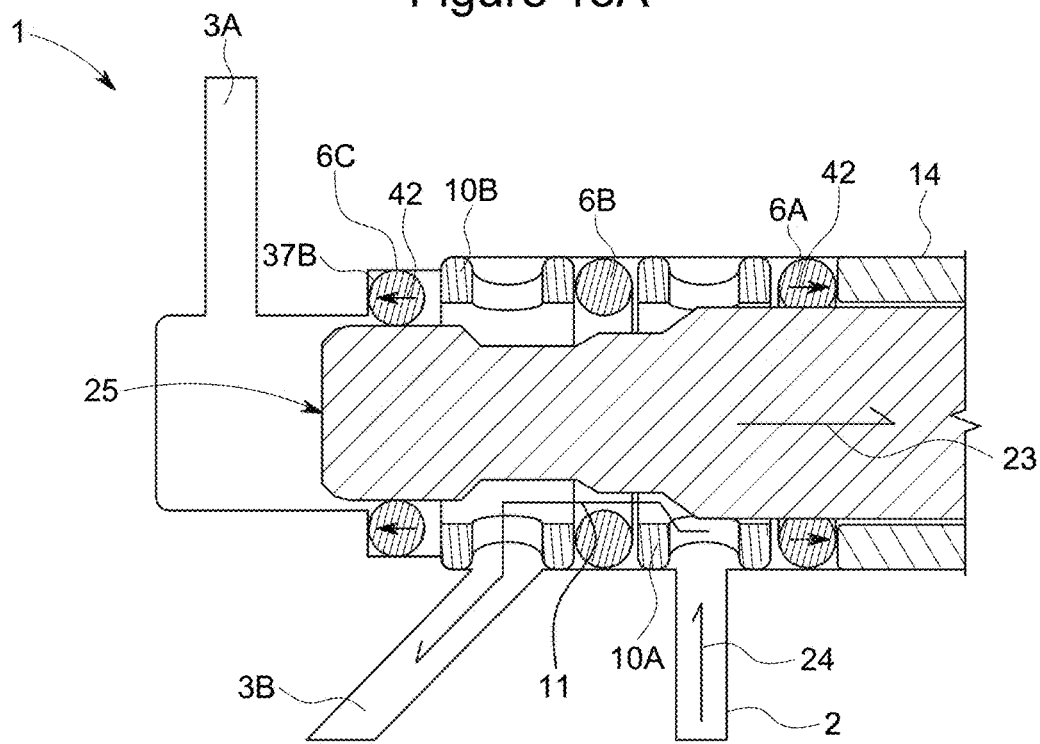

An example of a spool valve 1 using the present invention will now be described with reference to FIGS. 13A and 13B showing a 2 position 3 way valve.

FIG. 13B shows the spool valve 1 in the first position 16 fluid pressure acts through inlet port 2. The fluid exits the inlet port 2 into the bore 4. Spacer 10A is located adjacent, or directly over port 2, and allows through aperture 39 previously described, the fluid to pass from the spacer external diameter 13 to the spacer internal diameter 12 as shown by the black arrow. The spool b has a reduction as an undercut 44 in the spool outside diameter 13. This allows the fluid to pass from the spacer 10A across seal 6B which is clear of the spool outside diameter 13, to spacer 10B. From spacer 10B the fluid can pass from the spacer internal diameter 12 to the spacer external diameter 13. Spacer 10B sits over outlet port 3B, and thus the fluid can then pass out outlet port 3B to continue its work as needed. Spool 5 may be held in this position, in this case against bias 14, by an external force, for example an actuator 19 (not shown), or a pressure for example against piston face 25.

FIG. 13A shows the spool valve 1 in the second position 17. The spool 5 has translated along the longitudinal axis 15 in the first direction 22 opposite the first direction 23, under actuation of an external force, for example bias 21, or an actuator 19 (not shown). IN this position the fluid pressure 24 from inlet port 2 is prevented from moving through the valve, as seal internal diameters 8 of seals 6A and 6B are engaged on the land 43 of the spool outside diameter 9. Instead fluid pressure 24 from outlet port 3B can now flow backwards up the port 3B to the bore inside diameter 35, across from the spacer external diameter 13 via the aperture 39 to the spacer internal diameter 12. There the undercuts 44 of the spool 5 allow the fluid to pass to the outlet port 3A. This may relieve pressure from port 3B via 3A, or may be another flow path as desired.

The spool valve may take any number of forms as described, for example, but not limited to a 2 position 5 way valve, or a 3 (having a third position 18) position X way valve, although it could be modified for any number of ports as needed. The spool valve shown, or variations thereof, using the spacers 10 and seals 6 as described in various configurations with bores and ports (inlet and outlet) and a spool can be used in a number of industries. For example, but not limited to, oil and gas, hand tools, traps and other applications where a compact valve arrangement to direct fluid pressure quickly is needed and where ease of assembly, disassembly, and or operation is needed.

Isolate/Purge spool valves are sometimes found in fully pneumatic trigger arrangements for traditional tethered nail guns (or other fastening) tools. In these applications, in the trigger's rest position all chambers or a subset of chambers in the tool are supplied with pressurised air from the tool's air source which is typically a compressor or air tank fed by a compressor, which is connected to the tool via an air hose. When the trigger is activated (moved to its 2nd position) a differing set of chambers in the tool are supplied with, or are continued to be supplied with, pressurised air from the air source, while at the same time releasing air from at least 1 chamber which formerly contained pressure. A new force balance is achieved within the tool due to the changing pressures, which then results in movement of components to drive nails or whatever else the tool does in the course of it's operational cycle. When the trigger is returned to it's original position due to spring force, pressure force, or by action by the user, the original pressure state is achieved again.

For example in a hand held tool operation the spool valve of the present invention combines two valves into one, an operating valve and a safety or vent to atmosphere valve to prevent operation until "cocked" again. Such a spool valve 1 as the present invention is desirable as they are able to perform both isolation and purge operations in a single linear movement, suitable for actuation using a single push button or trigger (ie using a single moving element [not including seals]).

In another form using FIGS. 13A and 13B, spool valve 1 may work in a reverse operation where the position shown in FIG. 13B is moved to that position, for example by an actuator, or by a user, and is retained in that position by a pressure coming into port 3A (that is port 3A is now an inlet port), and the pressure coming in acts on piston 25 and has a net force greater than that of the bias 21. In this configuration the valve will allow from inlet port 2 to outlet port 3B, or vice versa. When pressure at port 3A is removed or reduced, then then valve will move to the position of FIG. 13A, thus preventing fluid movement from port 2 to port 3B. Any excess pressure in port 3B then flows out port 3A.

The invention may also consists in a kit of parts to retrofit an existing spool valve to the present invention. For example it may provide a spool 5, spacer(s) 10, and in-bore seal(s)s 6 and optionally a retention component 14 as needed. The existing bore 4 may already be suitable, or may require rework such as reshaping to enable the present invention.

It is to be understood that many variations of seals 6 and spacers 10 of the present invention arranged in a bore with a spool can be envisaged, and these variations all fall within the invention.

The foregoing description of the invention includes preferred forms thereof. Modifications may be made thereto without departing from the scope of the invention.

The invention claimed is:

1. A spool valve to valve a fluid between at least one inlet port and at least one outlet port, having a bore with a spool operably associated therein, comprising:
   the bore, having one or more of the at least one inlet port and the at least one outlet port;
   at least one in-bore seal located in the bore, the at least one in-bore seal fluidly sealing on a seal outer diameter to an inside diameter of the bore, and selectively fluidly sealing on a seal inside diameter to a spool outside diameter;
   at least one spacer located in the bore to float along a major longitudinal axis of the bore, adjacent the at least one in-bore seal having a fluid communication from a spacer internal diameter to a spacer external diameter and with the at least one inlet port, or the at least one outlet port;
   a removable retention component retaining the at least one spacer and the at least one in-bore seal within the bore; and
   the spool, slidingly mounted within the bore to translate along the major longitudinal axis of the bore, having,
      a first position where the spool prevents fluid flow from the at least one inlet port to the at least one outlet port by fluidly sealing to the at least one in-bore seal; and
      at least a second position, where the spool allows fluid flow from the at least one inlet port to the at least one outlet port by unsealing from the at least one in-bore seal, such that the spool valve is formed to allow or deny fluid flow across the valve,
   wherein, when the at least one in-bore seal and the at least one spacer are assembled in the bore and retained within the bore by the removable retention component, the at least one in-bore seal and the at least one spacer are configured to slide along the major longitudinal axis of the bore, but not such that the at least one in-bore seal can interact with the at least one inlet port or the at least one outlet port.

2. A spool valve as claimed in claim 1 wherein the valve either allows or prevents fluid flow but cannot vary a flow rate of the fluid flow.

3. A spool valve as claimed in claim 1 wherein there is a second in-bore seal located outwardly of a bore entrance.

4. A spool valve as claimed in claim 1 wherein the at least one spacer lies directly over, or in line with, the at least one inlet port, or at least one outlet port, it is in fluid communication therewith.

5. A spool valve as claimed in claim 1 wherein the spool has a third position where it allows, or prevents, flow from other, or the same, of the inlet ports to the same, or other, of the outlet ports, or vice versa.

6. A spool valve as claimed in claim 1 wherein there are multiple in-bore seals.

7. A spool valve as claimed in claim 6 wherein each of the multiple in-bore seals seals, whether selectively or not, to a respective spool outside diameter and there is a respective spacer of the at least one spacer between each of the multiple in-bore seals.

8. A spool valve as claimed in claim 1 wherein the spool contains one or more of the at least one inlet ports, or one or more of the at least one outlet ports or where the bore contains all the inlet ports and all the outlet ports.

9. A spool valve as claimed in claim 1 wherein the spool is externally actuated by an actuator on one end at or towards a bore entrance for movement from the first position to another position, or vice versa.

10. A spool valve as claimed in claim 1 wherein the spool is moved in a second direction, opposite the first, by fluid pressure on the spool, or part thereof.

11. A spool valve as claimed in claim 1 wherein the spool has an engagement end, at or toward an external entrance to the bore, and an operative end, distal from the engagement end, located within the bore at least for the first position or the second position.

12. A spool valve as claimed in claim 1 wherein the spool outside diameter is supported on a spacer internal diameter of a first spacer of the at least one spacer to act as a guide.

13. A spool valve as claimed in claim 1 wherein the spacers are separate to the respective in-bore seal(s) they space apart, or where one or more of the spacers is connected to at least one of the in-bore seals it spaces.

14. A spool valve as claimed in claim 1 wherein the fluid communication is provided by at least one aperture through from the spacer internal diameter to the spacer external diameter.

15. A spool valve as claimed in claim 14 wherein the spacer external diameter is recessed about an external periphery of the spacer, to provide the fluid communication from the at least one aperture to the at least one inlet port, or at least one outlet port.

16. A spool valve as claimed in claim 1 wherein components of the in-bore seal(s), spacer(s), and/or spool are removable by slidingly removing from the bore along the major longitudinal axis once the retention component is removed.

17. A spool valve as claimed in claim 1 wherein sealing is achieved through radial pressure of the in-bore seals against the inner diameter of the bore, and outer diameter of the spool.

18. A spool valve as claimed in claim 1 wherein a leading edge and or trailing edge of a sealing surface of the spool outside diameter is tapered to provide a transition for the in-bore seal when sealing and unsealing to the spool outside diameter.

19. A spool valve as claimed in claim 1 wherein the in-bore seals only apply pressure in a direction along the major longitudinal axis of the bore directly on the bore, or the at least one spacer, but not on another in-bore seal, whether directly or indirectly.

20. A spool valve as claimed in claim 1 wherein the spool contains one or more passages, whether open along their length, or closed to the spool outside diameter that allows additional flow path for the fluid.

21. A method of providing a spool valve to valve a fluid between at least one inlet port and at least one outlet port, comprising the steps of:
providing a bore having one or more of the at least one inlet port and the at least one outlet port;
sliding a spool linearly at least in part within the bore;
sealing an internal diameter of the bore, using at least one in-bore seal, between the internal diameter and in selective sliding engagement with an external diameter of the spool;
spacing the at least one in-bore seal within the bore using at least one spacer that floats along a longitudinal axis of the bore;
retaining the at least one in-bore seal, the at least one spacer, and the spool within bore, such that at least one spacer retains the at least one in-bore seal; and
sliding the spool so that it is in selective sliding engagement between a first position where the external diameter is clear of the at least one in-bore seal to allow fluid flow from the at least one inlet port, to the at least one outlet port, and a second position where the external diameter is sealed to the at least one in-bore seal to prevent fluid flow from the at least one inlet port, to the at least one outlet port,
such that the spool valve to control fluid flow is provided,
wherein when the at least one in-bore seal and the at least one spacer are assembled in the bore and retained within the bore, the method further comprises:
allowing the at least one in-bore seal and the at least one spacer to slide along the longitudinal axis of the bore, but such that the at least one in-bore seal is prevented from interacting with the at least one inlet port or the at least one outlet port.

22. A method as claimed in claim 21 wherein the method includes sealing on the external diameter through radial forces.

23. A spool valve to valve a fluid, comprising;
a bore having one or more inlets, and one or more outlets;
a spool slidingly operable within the bore;
one or more in-bore seals contained within the bore, the one or more in-bore seals fluidly sealing on a seal outer diameter to an inside of the bore, and selectively fluidly sealing on a seal inside diameter to a spool outside diameter;
at least one spacer located in the bore to float along a longitudinal axis of the bore, adjacent the one or more in-bore seals having a fluid communication from a spacer internal diameter to a spacer external diameter and with the one or more inlets, or the one or more outlets;
a removable retention component retaining the at least one spacer and the one or more in-bore seals within the bore; and
wherein the spool slides between at least two positions, a first of which prevents flow from at least one of the one or more inlets, to at least one or more of the outlets via a sealing of at least one of the in-bore seals on the at least one spool outside diameter, and a second of which allows flow from at least one of the one or more inlets, to at least one or more of the outlets by an unsealing of at least one of the in-bore seals on the at least one spool outside diameter, and
wherein when the one or more in-bore seals and the at least one spacer are assembled in the bored and retained within the bore by the removable retention component, the one or more in-bore seals and the at least one spacer are able to slide along the longitudinal axis of the bore, but not such that the one or more in-bore seals can interact with the one or more inlets of the one or more outlets.

* * * * *